(12) United States Patent
Marquez

(10) Patent No.: US 10,036,427 B2
(45) Date of Patent: Jul. 31, 2018

(54) CONSTANT VELOCITY JOINT BOOT ASSEMBLY

(71) Applicant: Jose Marquez, Port Richey, FL (US)

(72) Inventor: Jose Marquez, Port Richey, FL (US)

( * ) Notice: Subject to any disclaimer, the term of this patent is extended or adjusted under 35 U.S.C. 154(b) by 184 days.

(21) Appl. No.: 15/161,998

(22) Filed: May 23, 2016

(65) Prior Publication Data

US 2017/0335894 A1    Nov. 23, 2017

(51) Int. Cl.
   *F16D 3/84*    (2006.01)
   *F16J 3/04*    (2006.01)

(52) U.S. Cl.
   CPC ............... *F16D 3/845* (2013.01); *F16J 3/045* (2013.01)

(58) Field of Classification Search
   CPC .................................. F16D 3/845; F16J 3/045
   USPC .......... 464/173–175; 277/634–636; 206/810; 383/61.3
   See application file for complete search history.

(56) References Cited

U.S. PATENT DOCUMENTS

| | | | |
|---|---|---|---|
| 4,691,370 A * | 9/1987 | MacFee | A44B 19/34 383/61.3 X |
| 4,813,913 A | 3/1989 | Belter | |
| 5,222,746 A | 6/1993 | VanSteenbrugge | |
| 5,845,911 A | 12/1998 | Gimino | |
| 6,171,010 B1 | 1/2001 | Nagashima et al. | |
| D544,819 S | 6/2007 | Miller et al. | |
| 7,641,562 B2 | 1/2010 | Nakamara | |

* cited by examiner

*Primary Examiner* — Gregory John Binda

(57) ABSTRACT

A constant velocity joint boot assembly includes a boot that may be positioned around a constant velocity joint on a vehicle. The boot has a longitudinal cut. Thus, the boot may be selectively placed around the constant velocity joint when the constant velocity joint is mounted to the vehicle. A zipper is coupled to the boot. The zipper closes the boot around the constant velocity joint. The zipper extends beyond the first end of the boot and the second end of the boot to define a pair of free ends of the zipper. Each of the free ends of the zipper is rolled up when the zipper is closed. Thus, the zipper may resist being contaminated thereby enhancing functionally of the zipper over time.

5 Claims, 2 Drawing Sheets

CONSTANT VELOCITY JOINT BOOT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art including information disclosed under 37 CFR 1.97 and 1.98

The disclosure and prior art relates to boot devices and more particularly pertains to a new boot device for replacing a boot on a constant velocity joint without removing the constant velocity joint from a vehicle.

BRIEF SUMMARY OF THE INVENTION

An embodiment of the disclosure meets the needs presented above by generally comprising a boot that may be positioned around a constant velocity joint on a vehicle. The boot has a longitudinal cut. Thus, the boot may be selectively placed around the constant velocity joint when the constant velocity joint is mounted to the vehicle. A zipper is coupled to the boot to close the boot around the constant velocity joint. The zipper extends beyond the first end of the boot and the second end of the boot to define a pair of free ends of the zipper. Each of the free ends of the zipper is rolled up when the zipper is closed. Thus, the zipper resists being contaminated thereby enhancing functionally of the zipper over time.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
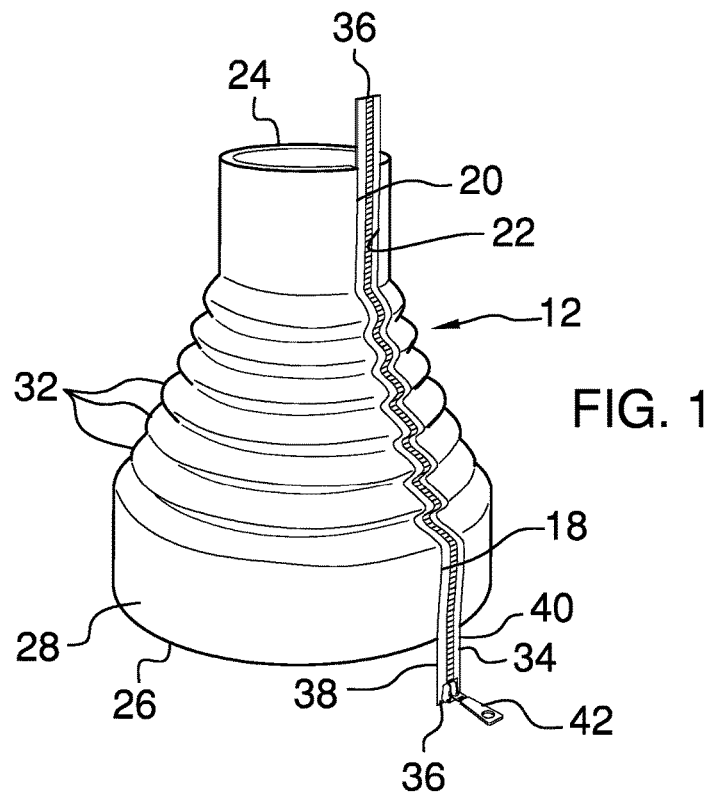
FIG. 1 is a perspective view of a constant velocity joint boot assembly according to an embodiment of the disclosure.
Figure 2:
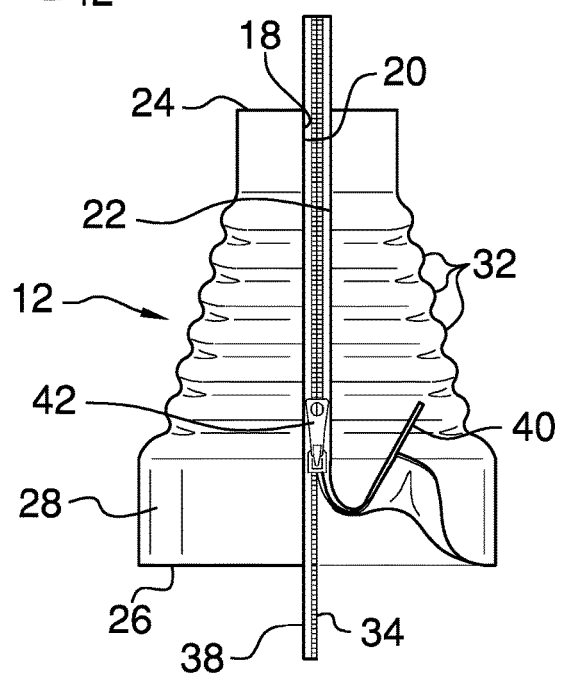
FIG. 2 is a front view of an embodiment of the disclosure.
Figure 3:
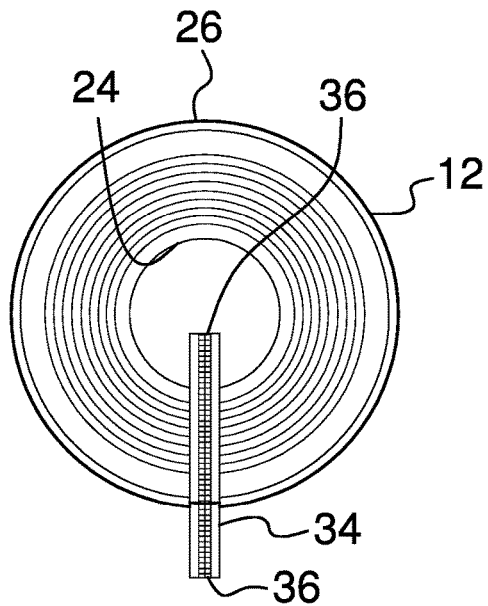
FIG. 3 is a bottom view of an embodiment of the disclosure.
Figure 4:
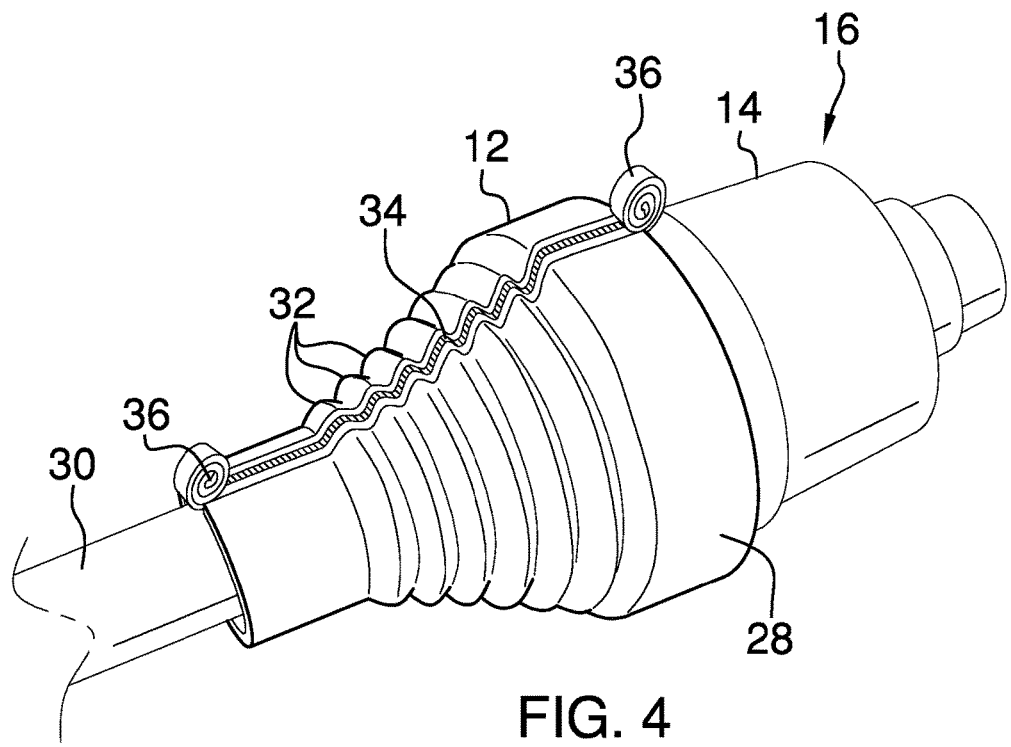
FIG. 4 is a perspective in-use view of an embodiment of the disclosure.

With reference now to the drawings, and in particular to FIGS. 1 through 4 thereof, a new boot device embodying the principles and concepts of an embodiment of the disclosure and generally designated by the reference numeral 10 will be described.

As best illustrated in FIGS. 1 through 4, the constant velocity joint boot assembly 10 generally comprises a boot 12 that may be positioned around a constant velocity joint 14 on a vehicle 16. The vehicle 16 may be a passenger vehicle or the like. The boot 12 may be comprised of a fluid impermeable material such as rubber or the like. Thus, the boot 12 retains inhibits grease from escaping the constant velocity joint 14. Moreover, the boot 12 may be comprised of a flexible material such as rubber or the like.

The boot 12 has a longitudinal cut 18. Thus, the boot 12 may be selectively placed around the constant velocity joint 14 when the constant velocity joint 14 is mounted to the vehicle 16. The longitudinal cut 18 has a first edge 20 and a second edge 22. The boot 12 has a first end 24, a second end 26 and an outer wall 28 extending therebetween. The outer wall 28 is continuous such that the boot 12 has a substantially cylindrical shape. Each of the first end 24 and the second end 26 is open and the boot 12 is substantially hollow.

The second end 26 may be placed around the constant velocity joint 14. The first end may 24 be placed around a half shaft 30 of the vehicle 16 thereby facilitating the boot 12 to surround bearings of the constant velocity joint 14. The outer wall 28 tapers inwardly between the second end 26 and the first end 24. Thus, the boot 12 has a cone shape. The outer wall 28 has a plurality of pleats 32. The pleats 32 are spaced apart from each other and are distributed between the second end 26 and the first end 24. Thus, the boot 12 may bend between the first end 24 and the second end 26.

A zipper 34 is provided and the zipper 34 is coupled to the boot 12. The zipper 34 may be manipulated thereby facilitating the zipper 34 to close the boot 12 around the constant velocity joint 14. The zipper 34 extends beyond the first 24 and second 26 ends of the boot 12 to define a pair of free ends 36 of the zipper 34. Each of the free ends 34 of the zipper is rolled up when the zipper 34 is closed. Thus, the zipper 34 may resist being contaminated by soil, rocks, grease or other particles thereby enhancing functionally of the zipper 34 over time.

The zipper 34 comprises a first half 38 coupled to the first edge 20 of the boot 12 and a second half 40 coupled to the second edge 22 of the boot 12. The zipper 34 further comprises a handle 42 that is slidably coupled between the first half 38 and the second half 40. The handle 42 may be manipulated to open and close the zipper 34. Moreover, the zipper 34 may be a metallic zipper or the like.

The zipper 34 is positioned in a closed position having the first half 38 being coupled to the second half 40. Thus, the zipper 34 retains the boot 12 on the constant velocity joint 14. The zipper 34 is positioned in an open position having the first half 38 being uncoupled from the second half 40. Thus, the boot 12 may be selectively placed around and removed from the constant velocity joint 14.

In use, the zipper 34 is positioned in the open position and the boot 12 is positioned around the constant velocity joint 14. The boot 12 is positioned such that the second end 26 frictionally engages the constant velocity joint 14 and the first end 24 frictionally engages the half shaft 30. The zipper 34 is positioned in the closed position. Thus, the boot 12 encloses the constant velocity joint 14. Each of the free ends 36 of the zipper 34 is rolled up and secured through any conventional means. Thus, the free ends 36 of the zipper 34 are inhibited from becoming contaminated thereby enhancing functionality of the zipper 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A constant velocity joint boot assembly being configured to be selectively removed and installed on a mounted constant velocity joint, said assembly comprising:

a boot being configured to be positioned around a constant velocity joint on a vehicle, said boot having a longitudinal cut wherein said boot is configured to be selectively placed around the constant velocity joint when the constant velocity joint is mounted to the vehicle, said boot having a first end, a second end and an outer wall extending therebetween; and a zipper being coupled to said boot wherein said zipper is configured to be manipulated thereby facilitating said zipper to close said boot around the constant velocity joint, said zipper extending beyond said first end of said boot and said second end of said boot to define a pair of free ends of said zipper.

2. The assembly according to claim 1, wherein said outer wall is continuous such that said boot has a substantially cylindrical shape, each of said first end and said second end being open, said boot being substantially hollow, said second end being configured to be placed around the constant velocity joint, said first end being configured to be placed around a half shaft of the vehicle thereby facilitating said boot to surround bearings of the constant velocity joint, said outer wall tapering inwardly between said second end and said first end such that said boot has a cone shape, said outer wall having a plurality of pleats being spaced apart from each other and being distributed between said second end and said first end wherein said boot is configured to bend between said first end and said second end.

3. The assembly according to claim 1, wherein said longitudinal cut has a first edge and a second edge.

4. The assembly according to claim 3, wherein said zipper comprises a first half being coupled to said first edge of said boot, said zipper comprising a second half being coupled to said second edge of said boot, said zipper being positioned in a closed position having said first half being coupled to said second half wherein said zipper is configured to retain said boot on the constant velocity joint, said zipper being positioned in an open position having said first half being uncoupled from said second half wherein said boot is configured to be selectively placed around and removed from the constant velocity joint.

5. A constant velocity joint boot assembly being configured to be selectively removed and installed on a mounted constant velocity joint, said assembly comprising:

a boot being configured to be positioned around a constant velocity joint on a vehicle, said boot having a longitudinal cut wherein said boot is configured to be selectively placed around the constant velocity joint when the constant velocity joint is mounted to the vehicle, said longitudinal cut having a first edge and a second edge, said boot having a first end, a second end and an outer wall extending therebetween, said outer wall being continuous such that said boot has a substantially cylindrical shape, each of said first end and said second end being open, said boot being substantially hollow, said second end being configured to be placed around the constant velocity joint, said first end being configured to be placed around a half shaft of the vehicle thereby facilitating said boot to surround bearings of the constant velocity joint, said outer wall tapering inwardly between said second end and said first end such that said boot has a cone shape, said outer wall having a plurality of pleats being spaced apart from each other and being distributed between said second end and said first end wherein said boot is configured to bend between said first end and said second end; and a zipper being coupled to said boot wherein said zipper is configured to be manipulated thereby facilitating said zipper to close said boot around the constant velocity joint, said zipper extending beyond said first end of said boot and said second end to define a pair of free ends of said zipper, said zipper comprising a first half being coupled to said first edge of said boot, said zipper comprising a second half being coupled to said second edge of said boot, said zipper being positioned in a closed position having said first half being coupled to said second half wherein said zipper is configured to retain said boot on the constant velocity joint, said zipper being positioned in an open position having said first half being uncoupled from said second half wherein said boot is configured to be selectively placed around and removed from the constant velocity joint.

\* \* \* \* \*